(12) United States Patent
Johnston

(10) Patent No.: US 6,351,128 B1
(45) Date of Patent: Feb. 26, 2002

(54) TOW MECHANISM FOR RESISTIVITY MAPPING APPARATUS

(75) Inventor: Jeffery M. Johnston, Berkeley, CA (US)

(73) Assignee: Geometrics, San Jose, CA (US)

( * ) Notice: Subject to any disclaimer, the term of this patent is extended or adjusted under 35 U.S.C. 154(b) by 0 days.

(21) Appl. No.: 09/273,081

(22) Filed: Mar. 19, 1999

(51) Int. Cl.⁷ .............................. G01V 3/06; F16B 45/06
(52) U.S. Cl. ........................ 324/357; 324/347; 24/598.6
(58) Field of Search ....................... 24/598.6; 324/326, 324/327, 329, 345, 347, 357, 358, 359, 360, 361, 362, 363, 364; 294/82.11, 82.17

(56) References Cited

U.S. PATENT DOCUMENTS

| | | | | |
|---|---|---|---|---|
| 415,030 A | * | 11/1889 | Dillard | 24/598.6 |
| 4,978,086 A | * | 12/1990 | Spicer | 242/107 |
| 6,037,784 A | * | 3/2000 | Smith | 324/694 |

OTHER PUBLICATIONS

Geometrics OhmMapper—Resistivity Mapping™—first distribution in Feb. 1999.
V.M. Timofeev, (Vsegingeo, Moscow, Russia), "Electric and Electromagnetic Profiling With Ground Capacitive Line–Antennas,"—paper presented at a seminar in USSR or in Russia, in or about 1995.

* cited by examiner

Primary Examiner—Hezron Williams
Assistant Examiner—Henry S. Anderson
(74) Attorney, Agent, or Firm—Townsend and Townsend and Crew LLP; Henry K. Woodward

(57) ABSTRACT

Resistivity mapping apparatus includes a tow mechanism for use by a human operator in moving the mapping apparatus over a surface and measuring the resistivity of soils of the surface. The tow mechanism includes a generally triangular shaped tow ring which is engageable by the operator's battery belt, harness, or pack-frame, the tow ring having two opposing hooks at a vertex of the tow ring for receiving a loop from a tow line. The tow line engages the tow ring and a cable depressor weight which keeps the resistivity mapping apparatus in close proximity to the earth as the apparatus is towed. A communication cable in the tow line preferably comprises an optical fiber which transmits signals from the receiver to a data logger carried by the operator.

21 Claims, 2 Drawing Sheets

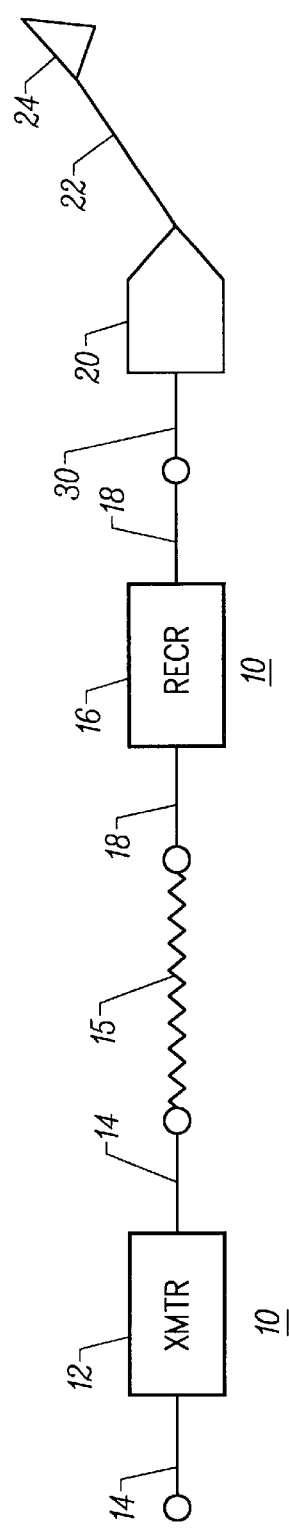
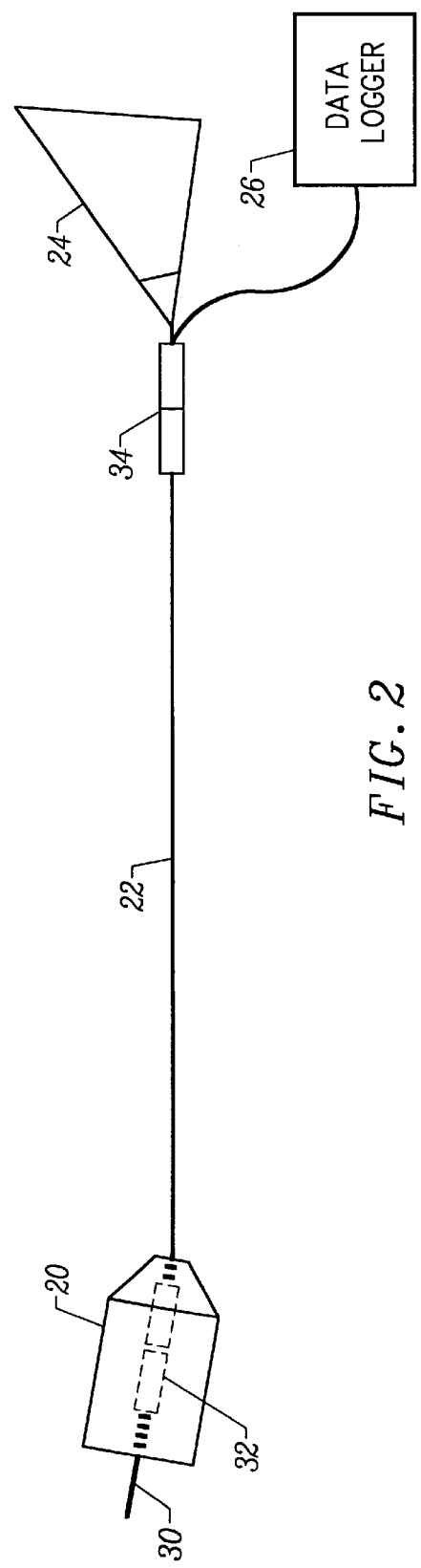
FIG. 1
FIG. 2

TOW MECHANISM FOR RESISTIVITY MAPPING APPARATUS

This patent application is related to application Ser. No. 09/270,132 entitled "Resistivity Measuring Apparatus Having Transmitter and Receiver With Power Level Signals", now U.S. Pat. No. 6,037,784, assigned to the present assignee.

BACKGROUND OF THE INVENTION

This invention relates generally to apparatus for resistivity mapping of the earth's surface, and more particularly the invention relates to a tow mechanism for use by a human operator in towing such apparatus over the surface of the earth to obtain resistivity measurements.

Resistivity measuring apparatus is known for measuring electrical properties of rock and soil. As described in co-pending application Ser. No. 09/270,132 (U.S. Pat. No. 6,037,784), supra, the resistivity of a material can be determined by passing a current through the material at one pair of electrodes and measuring received voltage at another pair of electrodes. This is a common practice in geophysical measurements in which a transmitter applies an alternating current to the ground through a first electrode structure, and voltage at the transmission frequency is detected by a receiver through a second electrode structure on the ground and spaced from the first electrode structure. The detected current is a measure of soil resistivity, assuming the transmitter power level (voltage, current) is known.

Typically, a coaxial-cable array with transmitter and receiver sections is pulled along the ground by a small vehicle, and electrical currents capacitively coupled to the ground from the transmitter are continuously detected by the receiver. The electrical properties are determined from the detected current as the apparatus traverses the surface.

The present invention is directed to resistivity mapping apparatus including a tow mechanism for use by a human operator in pulling the resistivity mapping apparatus across the surface.

SUMMARY OF THE INVENTION

In accordance with the invention resistivity mapping apparatus is provided for movement by a human operator across a surface and includes a transmitter with antenna electrode apparatus for coupling an electrical current to the earth surface, and at least one receiver including antenna electrode apparatus for receiving a signal from a transmitter antenna apparatus. A line such as rope serially connects the transmitter and receiver. The apparatus further includes a generally triangular shaped tow ring engageable by human operator, the tow ring having two opposing hooks at a vertex of the tow ring. A tow line engages the two opposing hooks of the tow ring and a cable depressor weight on the ground whereby the human operator can pull the cable depressor weight, transmitter and receiver over the earth surface.

In preferred embodiments the tow ring is engaged by a battery belt, harness, or suitable pack frame of the human operator. A signal transmission line in the tow line connects signals from the receiver to a data logger console carried by the human operator.

The invention and objects and features thereof will be more readily apparent from the following detailed description and appended claims when taken with the drawings.

BRIEF DESCRIPTION OF THE DRAWINGS

FIG. 1 is a schematic of resistivity mapping apparatus in accordance with the present invention.

FIG. 2 is a schematic of a tow ring and cable depressor weight of the apparatus in FIG. 1.

DETAILED DESCRIPTION OF ILLUSTRATIVE EMBODIMENTS

Figure 3A:
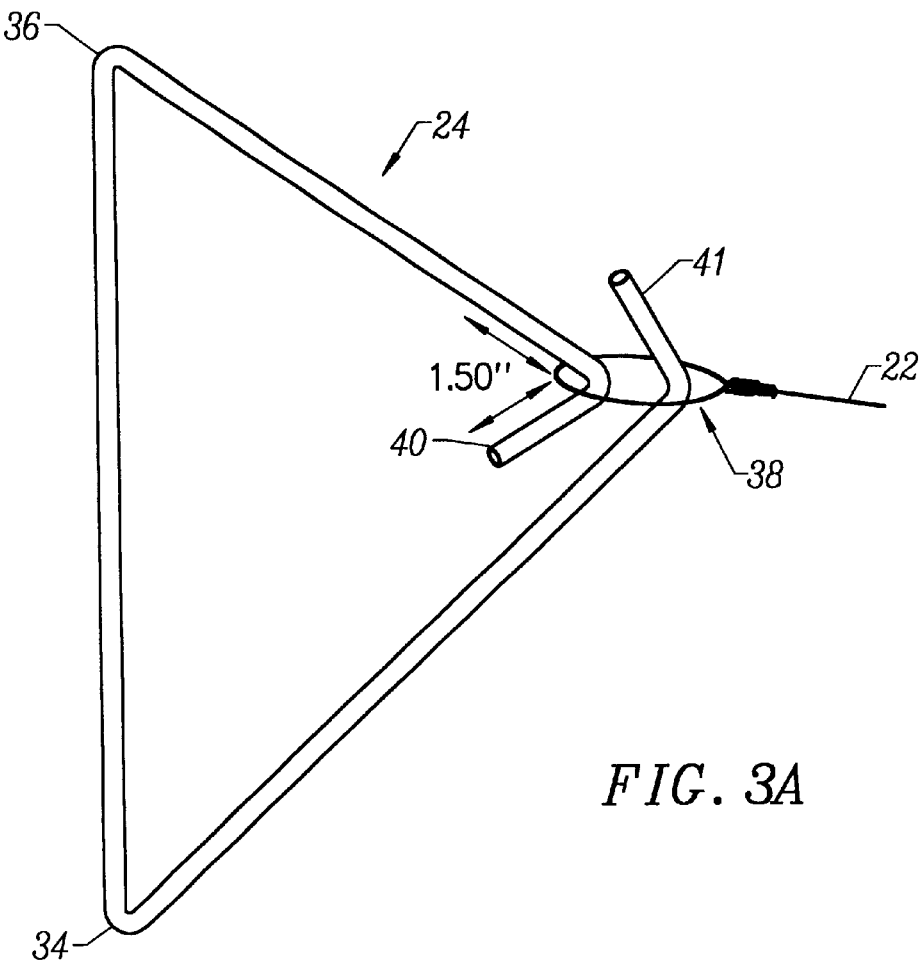
FIGS. 3A, 3B are illustrations of two embodiments of tow rings in accordance with the invention.

Referring now to the drawings, FIG. 1 illustrates resistivity mapping apparatus in accordance with the invention. A signal transmitter 12 has electrodes 14 coupled to soil 10, and at least one receiver 16 has electrodes 18 coupled to soil 10 at a point spaced from transmitter 12. Transmitter 12 and receiver 16 are connected by a non-conductive line or rope 15 so that the transmitter and receiver can be pulled over the ground. Resistivity of the soil is determined by applying a signal at a pre-determined measurement frequency through electrodes 14 to the soil and then detecting the voltage of the received signal by receiver 16 through electrodes 18. The signal generated by the transmitter produces an AC current at a fixed frequency in the range from a few kHz to several tens of kHz at a voltage level up to 1,000 volts. The detected voltage received by receiver 16 through electrodes 18 can be from an order of 1 micro volt to 1 volt. The transmitter current can be varied over a range of more than ten to one since the requisite current level applied to the soil is dependent on the resistivity of the soil.

In accordance with the invention the receiver and transmitter are connected through a cable depressor weight 20 and a tow line 22 to a tow ring 24 attached to a human operator whereby the human can pull the resistivity mapping apparatus over a surface. Tow line 22 can be kevlar aramid material with an optical fiber therein. As shown in more detail in FIG. 2, the cable depressor weight 20 is a cylindrical object weighing about ten pounds and having a conical nose for ease of travel over the ground. The weight is made of dense, non-conductive material which is counter-bored to allow the passage of communication cables from the receiver to a data logger module 26 carried by the human operator. The weight serves to keep the resistivity meter antenna in close proximity to the earth as the instrument is towed. In a preferred embodiment the communication line includes an electrical cable 30 which connects electrical signals from the receiver to a coupler 32 within weight 20. Coupler 32 includes a light emitting diode which convert electrical signals from line 30 to optical signals with the optical signals being transmitted through an optical fiber within tow line 22 to a second module 34 having a photo transistor for converting the optical signals back to electrical signals, which are then transmitted to a data logger 26 carried by the human operator.

Figure 3B:
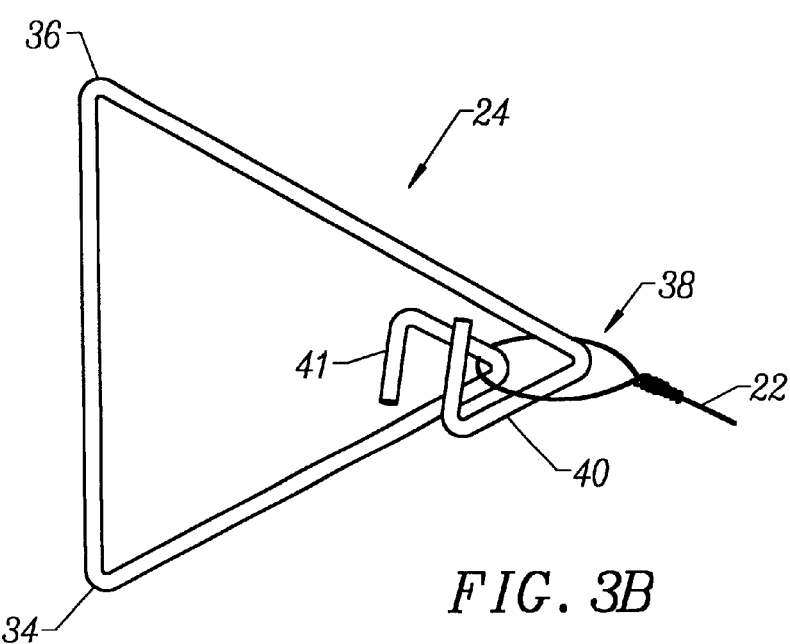

Tow ring 24 is generally triangular shaped which is fitted to a battery belt, harness, or suitable pack-frame carried by the human operator. FIGS. 3A, 3B illustrate two embodiments of a tow ring 24 in accordance with the invention. The tow ring is generally triangular in shape with vertices 34, 36, and 38. The side between vertices 34, 36 is received by the operator's belt, for example, and one or more loops from the tow line 22 (FIG. 2) is received by vertex 38. The ring is made from a steel rod with the ends of the rod shaped to form two opposing hooks 40, 41 at vertex 38. The two hooks are spaced from each other whereby the tow line loop cannot be disengaged unless the two hooks are pressed together. In FIG. 3B the end portion of each hook 40, 41 is bent to project generally in the plane of the triangular shape tow ring to prevent the end portions from snagging on other objects and pose a danger to the user.

There have been described resistivity mapping apparatus including a tow mechanism which permits a human operator to move the apparatus over a surface area. While the invention has been described with reference to specific embodiments, the description is illustrative of the invention and is not to be construed as limiting the invention. For example, a plurality of receivers can be provided in the apparatus. Various modifications and applications may occur to those skilled in the art without departing from the true spirit and scope of the invention as defined by the appended claims.

What is claimed is:

1. A tow mechanism for use by a human operator in resistivity mapping apparatus including a transmitter, a receiver, and antenna elements for coupling an electrical signal from the transmitter through the earth to the receiver, said tow mechanism comprising:
   a) a generally triangular shaped tow ring engageable by a human operator, the tow ring having two opposing spaced apart hooks at a vertex of the tow ring for receiving a loop from a tow line, whereby the loop can be disengaged from the hooks only by pressing the hooks towards each other,
   b) a cable depressor weight coupled to the antenna and receiver, and
   c) a tow line having a loop engaging the two opposing hooks of the tow ring and the cable depressor weight, whereby the human operator can pull the cable depressor weight, transmitter, and receiver over the earth's surface.

2. The tow mechanism as defined by claim 1 wherein the tow ring comprises a steel rod with a triangular shape and with ends of the rod meeting at one vertex of the triangular shape, the ends being bent to form the two opposing hooks.

3. The tow mechanism as defined by claim 2 wherein each hook is shaped to eliminate protruding ends.

4. The tow mechanism as defined by claim 3 wherein the end portion of each hook is bent to project generally in the plane of the triangular shape.

5. The tow mechanism as defined by claim 4 wherein the tow line includes a signal transmittal line for connecting signals from a receiver to a data logger console carried by the human operator.

6. The tow mechanism as defined by claim 5 wherein the transmission line comprises an optical fiber.

7. The tow mechanism as defined by claim 6 wherein the tow line comprises an aramid rope surrounding the optical fiber.

8. Resistivity mapping apparatus for use by a human operator in measuring electrical and physical properties of the earth's surface comprising
   a) a transmitter including an antenna for generating and coupling a current at a measurement frequency to the earth's surface,
   b) at least one receiver including an antenna for detecting electrical voltage at the measurement frequency at a point spaced from the transmitter,
   c) a line for serially connecting the transmitter and antenna with receiver and antenna,
   d) a cable depressor weight,
   e) a generally triangular shaped tow ring engageable by human operator, the tow ring having two opposing spaced apart hooks at a vertex of the tow ring for receiving a loop from a tow line, whereby the loop can be disengaged from the hooks only by pressing the hooks towards each other, and
   f) a tow line having a loop engaging the two opposing hooks of the tow ring and the cable depressor weight, whereby the human operator can pull the cable depressor weight, transmitter, and receiver over the earth's surface.

9. Resistivity mapping apparatus as defined by claim 8 wherein the tow line includes a signal transmission line for connecting signals from a receiver to a data logger console carried by the human operator.

10. Resistivity mapping apparatus as defined by claim 9 wherein the signal transmission line comprises an optical fiber.

11. Resistivity mapping apparatus as defined by claim 10 wherein the tow line comprises an aramid rope surrounding the optical fiber.

12. Resistivity mapping apparatus as defined by claim 9 wherein the tow ring comprises a steel rod with a triangular shape and with ends of the rod meeting at one vertex of the triangular shape, the ends being bent to form the two opposing hooks.

13. Resistivity mapping apparatus as defined by claim 12 wherein each hook is shaped to eliminate protruding ends.

14. Resistivity mapping apparatus as defined by claim 13 wherein the end portion of each hook is bent to project generally in the plane of the triangular shape.

15. Resistivity mapping apparatus as defined by claim 8 wherein the tow ring comprises a steel rod with a triangular shape with ends of the rod meeting at one vertex of the triangular shape, the ends being bent to form the two opposing hooks.

16. Resistivity mapping apparatus as defined by claim 15 wherein the tow line includes a signal transmission line for connecting signals from a receiver to a data logger console carried by the human operator.

17. Resistivity mapping apparatus as defined by claim 16 wherein the signal transmission line comprises an optical fiber.

18. Resistivity mapping apparatus as defined by claim 17 wherein the tow line comprises an aramid rope surrounding the optical fiber.

19. For use in towing resistivity mapping apparatus, a tow ring comprising a rod which is formed in a generally triangular shape with ends of the rod meeting at one vertex of the generally triangular shape, the ends forming two opposing spaced apart hooks for receiving a loop from a tow line whereby the loop can be disengaged from the hook only by pressing the hooks towards each other.

20. The tow ring as defined by claim 19 wherein each hook is shaped to eliminate protruding ends.

21. The tow ring as defined by claim 20 wherein the end portion of each hook is bent to project generally in the plane of the triangular shape.

* * * * *